United States Patent [19]

Satsurai

[11] Patent Number: 5,584,942
[45] Date of Patent: Dec. 17, 1996

[54] FLUX FOR SOLDERING

[75] Inventor: Reika Satsurai, Tokai, Japan

[73] Assignee: Hoshizaki Denki Kabushiki Kaisha, Aichi-ken, Japan

[21] Appl. No.: 252,096

[22] Filed: May 31, 1994

[30] Foreign Application Priority Data

May 28, 1993 [JP] Japan .................... 5-151494

[51] Int. Cl.⁶ ..................................... B23K 35/34
[52] U.S. Cl. ................................ 148/26; 148/23
[58] Field of Search ........................ 148/26, 23

[56] References Cited

U.S. PATENT DOCUMENTS

| | | | |
|---|---|---|---|
| 3,988,175 | 10/1976 | Baker | 148/26 |
| 4,619,715 | 10/1986 | Hwang | 148/26 |
| 4,941,929 | 7/1990 | Tecle | 148/26 |
| 5,052,612 | 10/1991 | Tecle | 148/26 |

*Primary Examiner*—Peter D. Rosenberg
*Attorney, Agent, or Firm*—Fisher & Associates

[57] ABSTRACT

A flux applied in soldering to a substrate metal formed thereon with a firmly oxidized layer, the flux containing at least stannous chloride, non-oxidation acid and a viscous agent and excluding zinc chloride therefrom.

6 Claims, 20 Drawing Sheets

10%

20%

30%

40%

50%

60%

70%

80%

90%

10%

20%

30%

44.4%

50%

60%

70%

0 %

3.7 %

7 %

12 %

20 %

40 %

50%

60%

70%

3.2 %

10 %

20 %

30 %

40 %

50 %

70 %

80 %

90 %

3.2 %

10 %

20 %

30 %

40 %

50 %

70%

80%

90%

0 %

0.5 %

0.9 %

5 %

10 %

20 %

40 %

0%

10%

20%

30%

39 %

50 %

60 %

70 %

NO. 1

NO. 2

NO. 3

NO. 4

NO. 5

NO. 6

NO. 7

NO. 8

NO. 9

NO. 1

NO. 2

NO. 3

NO. 4

NO. 5

NO. 6

NO. 7

NO. 7

(1)

(2)

(3)

(4)

(5)

(6)

(7)

5,584,942

FLUX FOR SOLDERING

BACKGROUND OF THE INVENTION

1. Field of the Invention

The present invention relates to a flux applied in soldering to a substrate metal formed with a firmly oxidized layer such as stainless steel, chromate treatment steel or the like.

2. Description of the Prior Art

As a conventional flux of this kind for use in soldering, there has been proposed a mixed salt of phosphoric acid or zinc chloride-ammonium chloride. The mixed salt of phosphoric acid is gentle at a room temperature but greatly activated at a high temperature. Thus, the mixed salt of phosphoric acid acts as a flux useful for removing an oxidized layer from a substrate metal such as stainless steel at a high temperature. Similarly, the mixed salt of zinc chloride-ammonium chloride is strong in chemical activation and acts as a flux useful for removing the oxidized layer from the substrate metal. In this case, potassium chloride, sodium chloride or the like is added to the mixed salt to enhance stability of the flux at a high temperature.

In these conventional fluxes, however, the flux reaction of phosphoric acid occurs only at a limited temperature range, for instance, of 0.1° C. at 213° C. It is, therefore, very difficult to adjust the treatment temperature of phosphoric acid, particularly in an automatic soldering line. In use of the mixed salt of zinc chloride-ammonium chloride, a large amount of zinc ion is included in washing water of residue of the flux. It is, therefore, required to conduct higher order treatment of the washing water under a strict regulation of zinc ion concentration for discharge of the water.

Additionally, in use of the mixed salt of zinc chloride-ammonium chloride, the concentration of zinc metal at a crystal grain boundary and a joint interface in the soldering layer increases, resulting in occurrence of corrosion along the crystal grain boundary and part corrosion along the joint interface. The occurrence of such corrosion causes peeling off of the solder at the joint layer.

SUMMARY OF THE INVENTION

It is, therefore, a primary object of the present invention to provide a flux capable of avoiding the occurrence of such corrosion at the crystal grain boundary and joint interface as described above.

According to the present invention, the object is attained by providing a flux applied in soldering to a substrate metal formed with a firmly oxidized layer, the flux containing at least stannous chloride, non-oxidation acid and a viscous agent and excluding zinc chloride therefrom.

In practical embodiments of the present invention, it is preferable that the flux contains the following chemical compound.

1) Potassium chloride or sodium chloride
2) Hydrochloric acid
3) At least one kind of chemical compound selected from the group of glycerol, polyethyleneglycol and sorbitol
4) Ammonium chloride
5) Nickel chloride The flux can be prepared in a simple manner by mixing and stirring the chemical compound, and the preparation of the flux can be safely carried out since the reaction of the chemical compound in mixing and stirring is caused as heat absorbing reaction. As is understood from each result of experiments described later, the flux is very useful in soldering of a substrate metal formed with a firmly oxidized layer such as stainless steel, chromate treatment steel or the like. Since the flux does not include any zinc chloride, any zinc ion is not included in washing water of residue of the flux. It is, therefore, able to cope with a difficulty under a strict regulation of zinc ion concentration for discharge of the water. It is also able to avoid the occurrence of corrosion along a crystal grain boundary and a joint interface in the soldering layer. This is useful to eliminate peeling off of the solder at the joint layer.

The flux containing the stannous chloride, non-oxidation acid and viscous agent has a minimum property required in soldering of the substrate metal formed with the firmly oxidized layer such as stainless steel, chromate treatment steel or the like. In the flux, the non-oxidation acid such as hydrochloric acid acts to restrain formation of basic salt of the stannous chloride, and the viscous agent such as grycerol, polyethylenegrycol, sorbitol or the like acts to prevent reoxidation of the flux.

The flux containing potassium chloride or sodium chloride can be used for various purposes. In the flux, the metal salt and stannous chloride causes a molten salt reaction thereof. It is, therefore, able to artificially adjust the melting temperature of the flux by the mixing ratio of the metal salt. Thus, the flux can be applied to various kinds of solders different in component. In use of the flux containing ammonium chloride, chlorine gases occur by heating of the ammonium chloride and act to change a metal oxide to a metal chloride, and the nickel chloride acts as a component for substitutive precipitation of metal in the plating component.

BRIEF DESCRIPTION OF THE DRAWINGS

For a better understanding of the present invention, and to show how the same may be carried into effect, reference will now be made, by way of example, to the accompanying drawings, in which.

DESCRIPTION OF THE PREFERRED EMBODIMENTS

Experiment 1

In this experiment, seven kinds of fluxes (No. 1 to No. 7) shown in the following table 1 were prepared and tested under the following condition to observe soldering properties of the fluxes in relation to the component thereof and to evaluate the characteristics of the fluxes. In the evaluation, a condition where a ring-shaped solder is widely spread without remaining the initial shape thereof was determined to be better, while a condition where the ring-shaped solder is shed in the initial shape was determined to be worse.

TABLE 1

| Flux No. | (Weight percent of each component relative to $SnCl_2\ 2H_2O$) | | | | | | |
|---|---|---|---|---|---|---|---|
|  | 1 | 2 | 3 | 4 | 5 | 6 | 7 |
| KCL | Variable | 20 | 20 | 20 | 20 | 20 | 20 |
| Conc. HCl | 44.4 | Variable | 44.4 | 44.4 | 44.4 | 44.4 | 44.4 |
| Glycerol | 12 | 12 | Variable | 12 | 12 | 12 | 12 |
| $H_2O$ | 67 | 67 | 67 | 67 | 67 | 67 | 67 |
| $NH_4Cl$ | 0 | 0 | 0 | Variable | 0 | 0 | 0 |
| $NiCl_2\ 6H_2O$ | 0 | 0 | 0 | 0 | Variable | 0 | 0 |
| Sorbitol | 0 | 0 | 0 | 0 | 0 | Variable | 0 |
| Polyethyleneglycol | 0 | 0 | 0 | 0 | 0 | 0 | Variable |

Experiment Condition

1. Substrate Metal

A sheet metal SUS304 of 0.6 mm in thickness was cut into a plurality of substrate metals in size of 50 mm in width and length. These substrate metals were immersed in an amount of strong alkaline cleaner containing silicate alkali salt at a temperature of 60° to 65° C. for fifteen (15) minutes. Thereafter, the substrate metals were washed by running water of 70° C. for five (5) minutes and dried after draining.

2. Solder

A string solder made of 100% tin and of 2 mm in diameter was wound once around a rod of 4 mm in diameter and formed in a ring shape. The ring-shaped solder was washed by running water of about 70° C. for five (5) minutes and dried after draining. Thereafter, the weight of the ring-shaped solder was measured.

3. Soldering Property

The ring-shaped solder was put on the respective fluxes coated on the cleaned substrate metals. Thus, the substrate metals were placed in a heating furnace so that the ring-shaped solder is heated and melted at 250° C. for five (5) minutes. After cooling, the substrate metals were cleaned by ultrasonic washing for five (5) minutes to observe spread conditions of the solder.

Component of the Fluxes and Soldering Properties of the Same

Figure 1A:
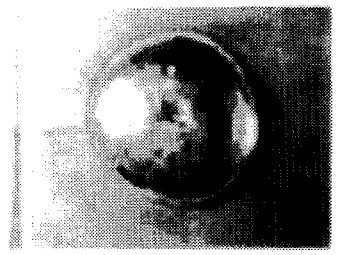
FIGS. 1(a) to 1(i) are photographs respectively showing a spread condition of a solder relative to the concentration of potassium chloride in a flux containing stannous chloride as a main component.
Figure 1B:
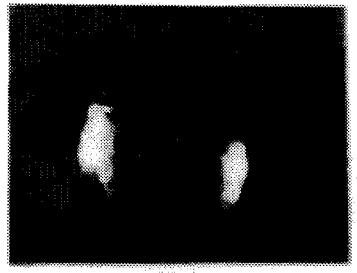
Figure 1C:
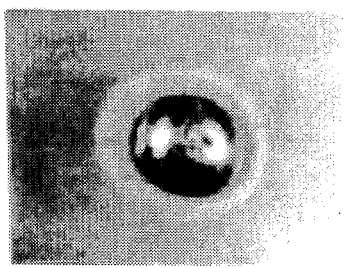
Figure 1D:
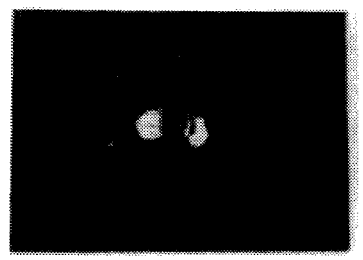
Figure 1E:
Figure 1F:
Figure 1G:
Figure 1H:
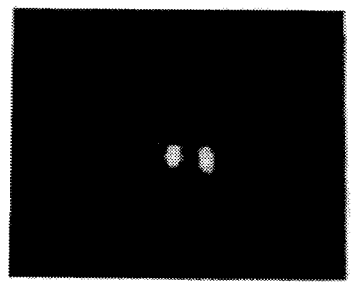
Figure 1I:
Figure 2A:
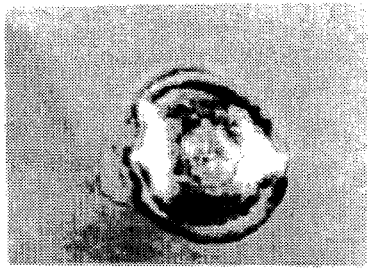
FIGS. 2(a) to 2(g) are photographs respectively showing a spread condition of a solder relative to the concentration of concentrated hydrochloric acid in a flux containing stannous chloride as a main component.
Figure 2B:
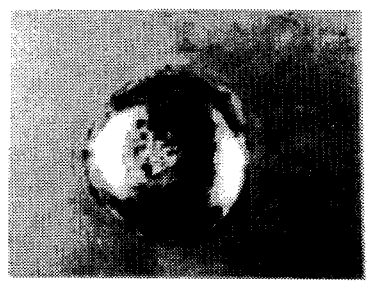
Figure 2C:
Figure 2D:
Figure 2E:
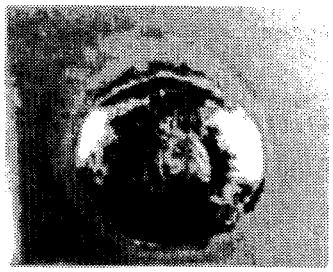
Figure 2F:
Figure 2G:
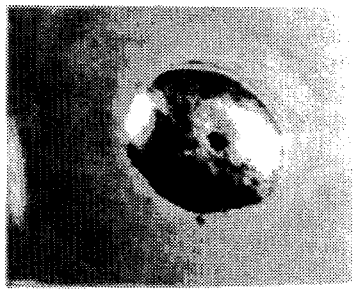
Figure 3A:
FIGS. 3(a) to 3(i) are photographs respectively showing a spread condition of a solder relative to the concentration of glycerol in a flux containing stannous chloride as a main component.
Figure 3B:
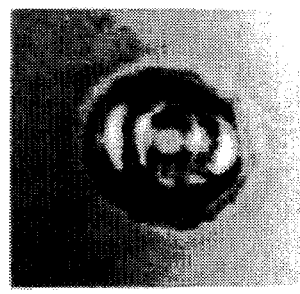
Figure 3C:
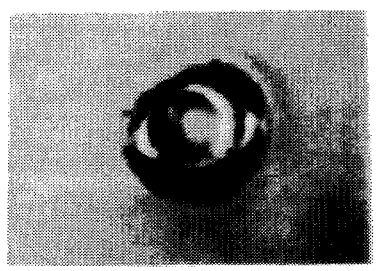
Figure 3D:
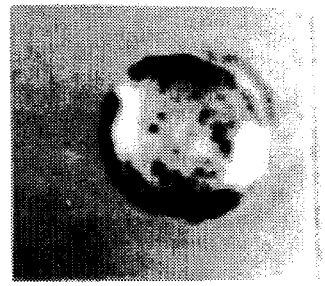
Figure 3E:
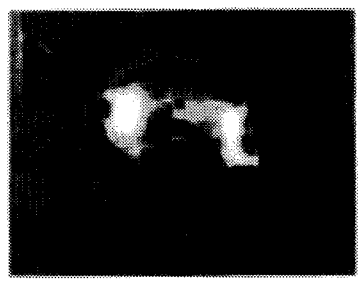
Figure 3F:
Figure 3G:
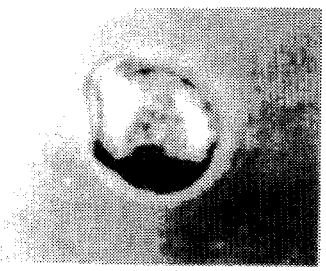
Figure 3H:
Figure 3I:
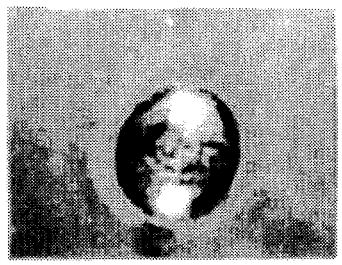
Figure 4A:
FIGS. 4(a) to 4(i) are photographs respectively showing a spread condition of a solder relative to the concentration of ammonium chloride in a flux containing stannous chloride as a main component.
Figure 4B:
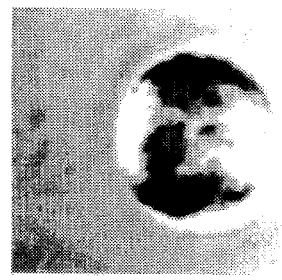
Figure 4C:
Figure 4D:
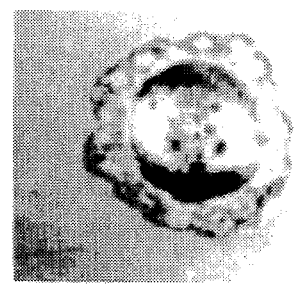
Figure 4E:
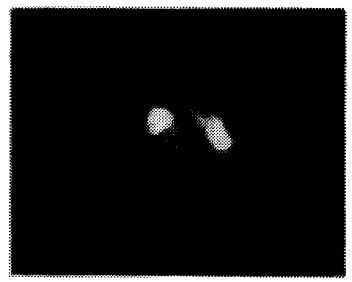
Figure 4F:
Figure 4G:
Figure 4H:
Figure 4I:
Figure 5A:
FIGS. 5(a) to 5(i) are photographs respectively showing a spread condition of a solder relative to the concentration of nickel chloride in a flux containing stannous chloride as a main component.
Figure 5B:
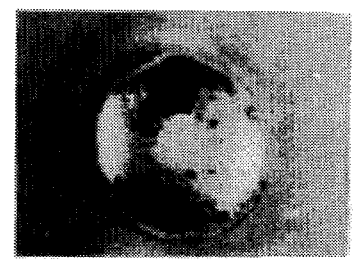
Figure 5C:
Figure 5D:
Figure 5E:
Figure 5F:
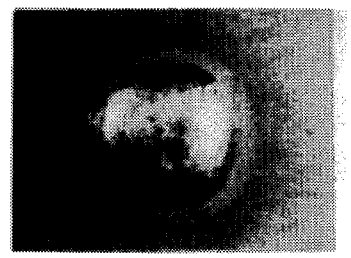
Figure 5G:
Figure 5H:
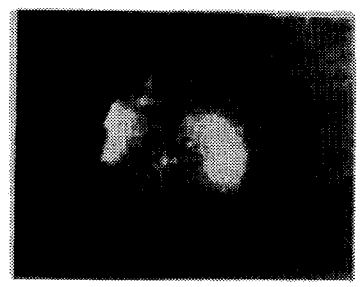
Figure 5I:
Figure 6A:
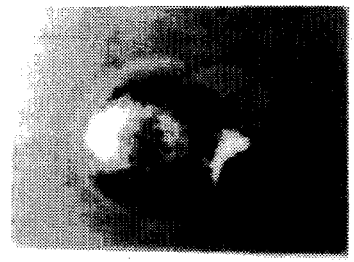
FIGS. 6(a) to 6(g) are photographs respectively showing a spread condition of a solder relative to the concentration of sorbitol in a flux containing stannous chloride as a main component.
Figure 6B:
Figure 6C:
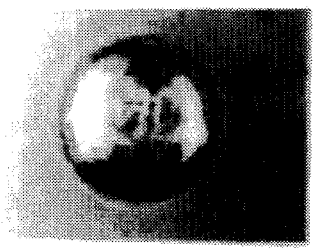
Figure 6D:
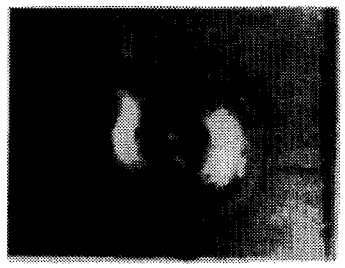
Figure 6E:
Figure 6F:
Figure 6G:
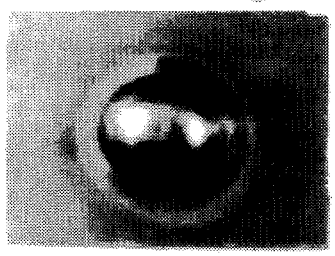
Figure 7A:
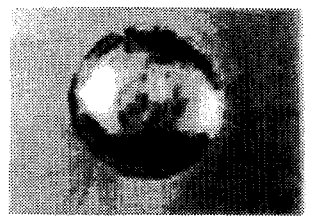
FIGS. 7(a) to 7(h) are photographs respectively showing a spread condition of a solder relative to the concentration of polyethyleneglycol in a flux containing stannous chloride as a main component.
Figure 7B:
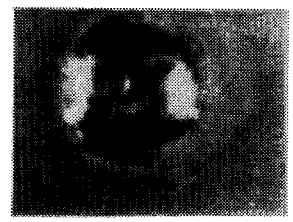
Figure 7C:
Figure 7D:
Figure 7E:
Figure 7F:
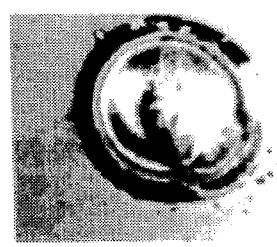
Figure 7G:
Figure 7H:
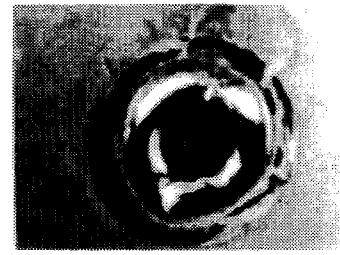

A result of the experiment conducted under the foregoing condition is shown in the following table 2, and the spread conditions of the fluxes are shown in photographs of FIGS. 1(a)–1(i) to 7(a)–7(h).

TABLE 2

Flux No. 1 (KCl: wt %)

| wt % | 10 | 20 | 30 | 40 | 50 | 60 | 70 | 80 | 90 |
|---|---|---|---|---|---|---|---|---|---|
| Result | O | O | O | O | X | X | X | X | X |

Flux No. 2 (HCl: wt %)

| wt % | 10 | 20 | 30 | 40 | 50 | 60 | 70 |
|---|---|---|---|---|---|---|---|
| Result | O | O | O | O | O | O | O |

Flux No. 3 (Glycerol: wt %)

| wt % | 0 | 3.7 | 7 | 12 | 20 | 40 | 50 | 60 | 70 |
|---|---|---|---|---|---|---|---|---|---|
| Result | X | X | X | O | O | O | O | O | O |

Flux No. 4 (Ammonium chloride: wt %)

| wt % | 3.2 | 10 | 20 | 30 | 40 | 50 | 60 | 70 | 80 | 90 |
|---|---|---|---|---|---|---|---|---|---|---|
| Result | O | O | O | O | O | O | O | O | O | O |

Flux No. 5 (Nickel chloride: wt %)

| wt % | 3.2 | 10 | 20 | 30 | 40 | 50 | 60 | 70 | 80 | 90 |
|---|---|---|---|---|---|---|---|---|---|---|
| Result | O | O | O | O | O | O | O | O | O | O |

Flux No. 6 (Sorbitol: wt %)

| wt % | 0 | 0.5 | 0.9 | 5 | 10 | 20 | 40 |
|---|---|---|---|---|---|---|---|
| Result | O | O | O | O | O | O | O |

Flux No. 7 (Polyethylene glycol: wt %)

| wt % | 0 | 10 | 20 | 30 | 39 | 50 | 60 | 70 |
|---|---|---|---|---|---|---|---|---|
| Result | O | O | O | O | O | O | O | X |

From the result of the experiment, it has been confirmed that an excellent soldering property is obtainable in the fluxes containing stannous chloride, concentrated hydrochloric acid and at least either one of glycerol, sorbitol and polyethyleneglycol. In the case that potassium chloride is added to the flux to rise the melting temperature or that ammonium chloride is added to the flux to change a metal oxide to a metal chloride, the excellent soldering property is also obtainable. In each component of the fluxes, it has been recognized that there is an upper limit in the containing amount of sodium chloride and that there is a lower limit in the containing amount of glycerol.

Experiment 2

In this experiment, nine kinds of fluxes (No. 1 to No. 9) were prepared as shown in the following table 3. Thus, each appearance of the respective fluxes, a spread area of solder, a shearing load of solder and an immersed condition were observed. In the fluxes, the flux of No. 1 was prepared in accordance with the present invention.

TABLE 3

| Flux No. | 1 | 2 | 3 | 4 | 5 | 6 | 7 | 8 | 9 |
| --- | --- | --- | --- | --- | --- | --- | --- | --- | --- |
| $SnCl_2 \cdot 2H_2O$ | 27.5 | 4.0 | 0 | 0 | 1.0 | 2.0 | 4.0 | 0 | 0 |
| KCl | 6.9 | 0 | 0 | 0 | 0 | 0 | 0 | 0 | 0 |
| $NH_4Cl$ | 0.9 | 3.0 | 1.9 | 2.0 | 5.0 | 6.0 | 3.0 | 3.0 | 8.3 |
| $NiCl_2 \cdot 6H_2O$ | 0.9 | 0 | 0 | 0 | 0 | 0 | 0 | 0 | 0 |
| Conc. HCl | 2.6 | 1.0 | 1.5 | 4.0 | 0 | 2.0 | 0.8 | 2.0 | 3.0 |
| Glycerol | 5.5 | 0 | 0 | 0 | 0 | 0 | 0 | 0 | 0 |
| Sorbitol | 0.3 | 0 | 0 | 0 | 0 | 0 | 0 | 0 | 0 |
| Polyethyleneglycol | 0.5 | 0 | 0 | 0 | 0 | 0 | 0 | 0 | 0 |
| $ZnCl_2$ | 0 | 34.9 | 15.0 | 17.0 | 35.0 | 40.0 | 35.0 | 24.0 | 25.8 |
| Phosphoric acid | 0 | 0 | 79.8 | 0 | 0 | 0 | 0 | 0 | 0 |
| NaCl | 0 | 0 | 0 | 4.0 | 0 | 0 | 0 | 0 | 0 |
| Non-ion surfactant | 0 | 0 | 0 | 0 | 0 | 0 | 0 | 0 | 2.5 |
| $H_2O$ | 54.9 | 57.1 | 1.9 | 73.0 | 59.0 | 50.0 | 57.2 | 71.0 | 59.4 |

Experiment Condition

1. Spread of Solder

Figure 8A:
FIGS. 8(a) to 8(i) are photographs respectively showing a spread condition of a solder in application of various kinds of fluxes.
Figure 8B:
Figure 8C:
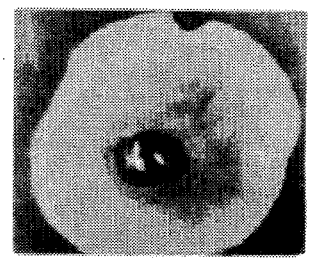
Figure 8D:
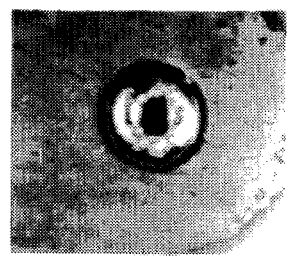
Figure 8E:
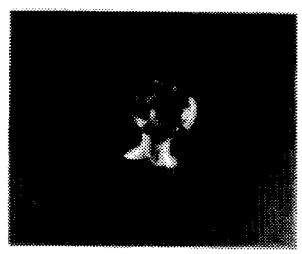
Figure 8F:
Figure 8G:
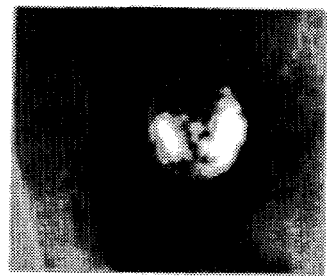
Figure 8H:
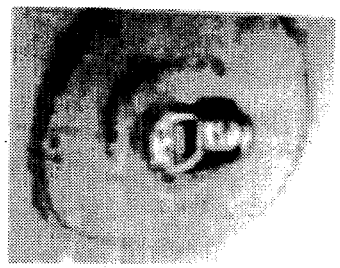
Figure 8I:
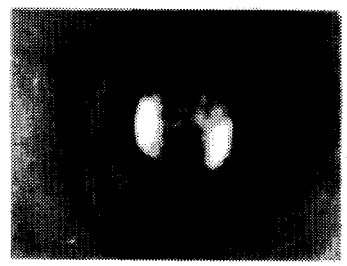

The same substitute metals as in the Experiment 1 were tested under the same condition to observe a spread area of the solder. An average spread area of the solder is shown in the following table 4, and spread conditions of the solder are shown in photographs of FIGS. 8(a)–8(i).

2. Shearing Load of Solder

A sheet metal SUS304 of 0.6 mm in thickness was cut into a plurality of substrate metals in size of 25 mm in length and 100 mm in width, and a tape solder of more than 95 wt% tin and 3 wt% silver and of the same size as the respective substrate metals was cleaned. Thus, the tape solder was put on the cleaned substrate metals respectively, and the substrate metals were placed in a heating furnace so that the solder is heated and melted at 250° C. for five (5) minutes. After cooling, the substrate metals were cleaned by ultrasonic washing, and each shearing load of the substrate metals was measured by a tension tester. Each average shearing load in the measurement is shown in the following table 4.

TABLE 4

| Flux No. | Appearance | Spread area ($cm^2/g$) | Shearing load (kg f) | Affixed condition |
| --- | --- | --- | --- | --- |
| 1 | Transparent light green | 2.64 | 742 | Better |
| 2 | Cloudiness precipitation | 2.28 | 573 | Better |
| 3 | Cloudiness viscosity | 0.00 | — | Worse |
| 4 | Colorless transparent | 2.08 | 13 | Better |
| 5 | Cloudiness precipitation | 2.09 | 296 | Worse (shedding) |
| 6 | Colorless transparent | 2.06 | 519 | Worse (shedding) |
| 7 | Cloudiness precipitation | 2.28 | 525 | Worse |
| 8 | Colorless transparent | 1.35 | 289 | Worse (shedding) |
| 9 | Colorless transparent | 2.37 | 744 | Worse (shedding) |

3. Immersion Test

Figure 9A:
FIGS. 9(a) to 9(h) are photographs respectively showing an adhered condition of tin in an immersion method of various kinds of fluxes.
Figure 9B:
Figure 9C:
Figure 9D:
Figure 9E:
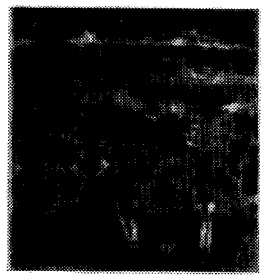
Figure 9F:
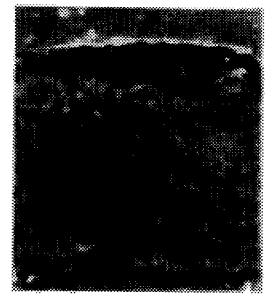
Figure 9G:
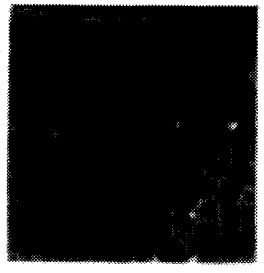
Figure 9H:
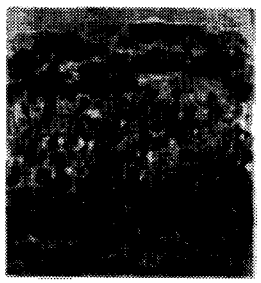
Figure 10A:
FIGS. 10(a) to 10(g) are photographs respectively showing a spread condition of a solder in application of a flux containing stannous chloride to respective substrate metals.
Figure 10B:
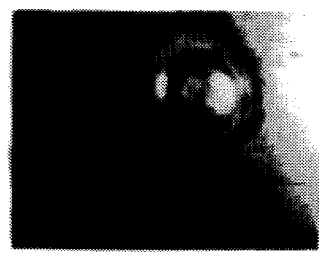
Figure 10C:
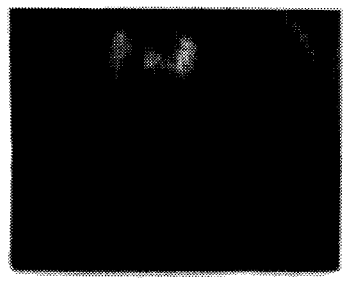
Figure 10D:
Figure 10E:
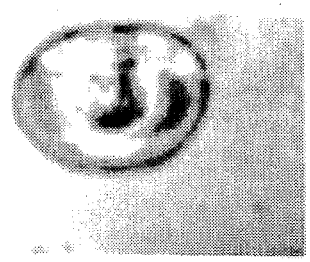
Figure 10F:
Figure 10G:

An amount of tin was melted in a vessel, and slag on the surface of melted tin was eliminated. The same substrate metals as in the experiment 1 were coated with the fluxes and slowly immersed in the melted tin in the vessel for ten (10) minutes. Thereafter, the substrate metals were slowly lifted from the vessel and cleaned by ultrasonic washing after cooling to observe adhesiveness of tin. A result of the observation is shown in the table 4, and adhered conditions of tin are shown in photographs of FIGS. 9(a)–9(h).

Evaluation

In the flux (No. 1) of the present invention, it has been found that the appearance becomes transparent, the spread area of the solder becomes large, the shearing load becomes large and the adhesiveness of the solder is better. The other fluxes, however, are better in one or more characteristics but worse in the other characteristics.

Experiment 3

In this experiment 3, the flux No. 1 of the experiment 2 was adapted to observe effectiveness to seven kinds of substrate metals listed below. Under the same experiment condition as in the experiment 1, the soldering property of the flux was observed as shown in the following table 5 and in photographs of 10(a)–10(g).

Substrate metals

1) . . . Copper, 2) . . . Nickel Clad-SUS304, 3) . . . Stainless steel SUS430, 4) . . . Stainless steel SUS304, 5) . . . Zinc sheet metal SGCC F06, 6) . . . Aluminum A1100P, 7) . . . Titanium.

TABLE 5

| Substrate metal | 1 | 2 | 3 | 4 | 5 | 6 | 7 |
| --- | --- | --- | --- | --- | --- | --- | --- |
| Soldering property | O | O | O | O | X | X | X |

From the above result, it has been confirmed that the flux of the present invention is very effective to copper, steel SUS304 but ineffective to zinc sheet metal SGCC F06, aluminum A1100P and titanium. Particularly, in application to aluminum A1100P, a change of color into white caused by melting corrosion was recognized, and any spread of the solder was not recognized.

What is claimed is:

1. A flux applied in soldering to a substrate metal formed with a firmly oxidized layer, said flux containing at least stannous chloride, non-oxidation acid and a viscous agent and excluding zinc chloride and sodium fluoride therefrom, said viscous agent having a viscosity between 300 and 1000 cp at 0° C.

2. The flux as recite in claim 1, further containing potassium chloride or sodium chloride.

3. The flux as recited in claim 1 wherein said non-oxidation acid is hydrochloric acid.

4. The flux as recited in claim 1 wherein said viscous agent includes at least one kind of chemical compound selected from the group consisting of glycerol, polyethyleneglycol and sorbitol.

5. The flux as recited in claim 1, further containing ammonium chloride.

6. The flux recited in claim 1, further containing nickel chloride.

* * * * *